United States Patent
Yang

(10) Patent No.: US 8,594,645 B2
(45) Date of Patent: Nov. 26, 2013

(54) APPARATUS TO MODIFY APPLICATIONS OF MOBILE TERMINAL

(75) Inventor: Dong-hyuk Yang, Seoul (KR)

(73) Assignee: Pantech Co., Ltd., Seoul (KR)

( * ) Notice: Subject to any disclaimer, the term of this patent is extended or adjusted under 35 U.S.C. 154(b) by 0 days.

(21) Appl. No.: 12/847,301

(22) Filed: Jul. 30, 2010

(65) Prior Publication Data

US 2011/0053635 A1 Mar. 3, 2011

(30) Foreign Application Priority Data

Sep. 1, 2009 (KR) .................. 10-2009-0082076

(51) Int. Cl.
*H04M 11/00* (2006.01)
(52) U.S. Cl.
USPC ..................... 455/418; 455/405; 455/407
(58) Field of Classification Search
USPC .......... 455/405, 412.1, 414.1, 418, 461, 466, 455/566; 705/14.1–14.39
See application file for complete search history.

(56) References Cited

U.S. PATENT DOCUMENTS

| | | | |
|---|---|---|---|
| 7,634,731 B2 * | 12/2009 | Lee | ................................ 455/566 |
| 2006/0234759 A1 | 10/2006 | Kim et al. | |
| 2008/0079609 A1 * | 4/2008 | Kallqvist | ........................ 341/22 |
| 2009/0030783 A1 * | 1/2009 | Schloo | ............................. 705/14 |
| 2009/0253454 A1 * | 10/2009 | Sampson | .................. 455/550.1 |
| 2010/0227649 A1 * | 9/2010 | Lestreus | ........................ 455/566 |
| 2011/0028138 A1 * | 2/2011 | Davies-Moore et al. | ..... 455/418 |

FOREIGN PATENT DOCUMENTS

| | | |
|---|---|---|
| CN | 1794739 | 6/2006 |
| JP | 2007-264923 | 10/2007 |
| KR | 10-2006-0093274 | 8/2006 |
| KR | 10-0638222 | 10/2006 |
| KR | 10-0695912 | 2/2007 |
| KR | 10-2007-0075171 | 7/2007 |
| KR | 10-0817811 | 3/2008 |

OTHER PUBLICATIONS

English Translation of Chinese Office Action issued to related Chinese Patent Application No. 201010269261.5, dated Nov. 23, 2012.

* cited by examiner

*Primary Examiner* — Kent Chang
*Assistant Examiner* — Nelson Rosario
(74) *Attorney, Agent, or Firm* — H.C. Park & Associates, PLC

(57) ABSTRACT

An experience modification apparatus for a mobile terminal generates a modification event upon detecting execution of an application provided by the mobile terminal or upon detecting a specific order of key inputs so as to modify the applications of the mobile terminal.

17 Claims, 3 Drawing Sheets

APPARATUS TO MODIFY APPLICATIONS OF MOBILE TERMINAL

CROSS-REFERENCE TO RELATED APPLICATION

This application claims priority from and the benefit under 35 U.S.C. §119(a) of Korean Patent Application No. 10-2009-0082076, filed on Sep. 1, 2009, the disclosure of which is incorporated by reference in its entirety for all purposes.

BACKGROUND

1. Field

The following description relates to modifying applications of a mobile terminal, and more particularly, to an apparatus to modify applications of a mobile terminal.

2. Discussion of the Background

People in their teens and twenties have a tendency to prefer personalized products or services differentiated from others, have a higher competitive spirit than other ages, and have a sensitive enough nature to enjoy becoming emotionally and sentimentally attached to their electronic devices.

In order to satisfy such qualities of young people, modifying applications of a mobile terminal provide users with a greater affinity to his or her mobile terminal, and thus, young people may use such mobile terminals with more interest.

SUMMARY

Exemplary embodiments of the present invention provide an apparatus to modify applications of a mobile terminal in accordance with their use.

Exemplary embodiments of the present invention provide an apparatus to modify applications of a mobile terminal if inputs to particular keys are made in a specific order.

Exemplary embodiments of the present invention provide an experience modification apparatus to update execution information of the application, to compare the updated execution information with a threshold value, and to generate a change event according to the result of the comparison if execution of an application provided by a mobile terminal is detected.

Exemplary embodiments of the present invention provide an experience modification apparatus to generate a modification event if inputs to particular keys are made in a order.

Additional features of the invention will be set forth in the description which follows, and in part will be apparent from the description, or may be learned by practice of the invention.

An exemplary embodiment provides an experience modification apparatus for a mobile terminal including an execution detector to detect execution of an application provided by the mobile terminal; an execution information manager to update execution information of the application, if the execution of an application is detected by the execution detector; an execution information comparing unit to compare the updated execution information with a threshold value; and an event manager to generate a modification event according to the result of the comparison.

An exemplary embodiment provides an experience modification apparatus for a mobile terminal including a key input detector to detect an order of key inputs; and an event manager to generate a modification event if the order of key inputs detected by the key input detector is a specific order of key inputs.

An exemplary embodiment provides an experience modification method including detecting execution of an application of a mobile terminal; updating execution information of the application; determining if the updated execution information is greater than a threshold value; and generating a modification event if the updated execution information is determined to be greater than the threshold value.

An exemplary embodiment provides an experience modification method including detecting key inputs of a mobile terminal; determining if the key inputs are a specific order of key inputs; and generating a modification event if the key inputs are the specific order of key inputs.

It is to be understood that both the foregoing general description and the following detailed description are exemplary and explanatory and are intended to provide further explanation of the invention as claimed. Other objects, features and advantages will be apparent from the following description, the drawings, and the claims.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

Figure 1:
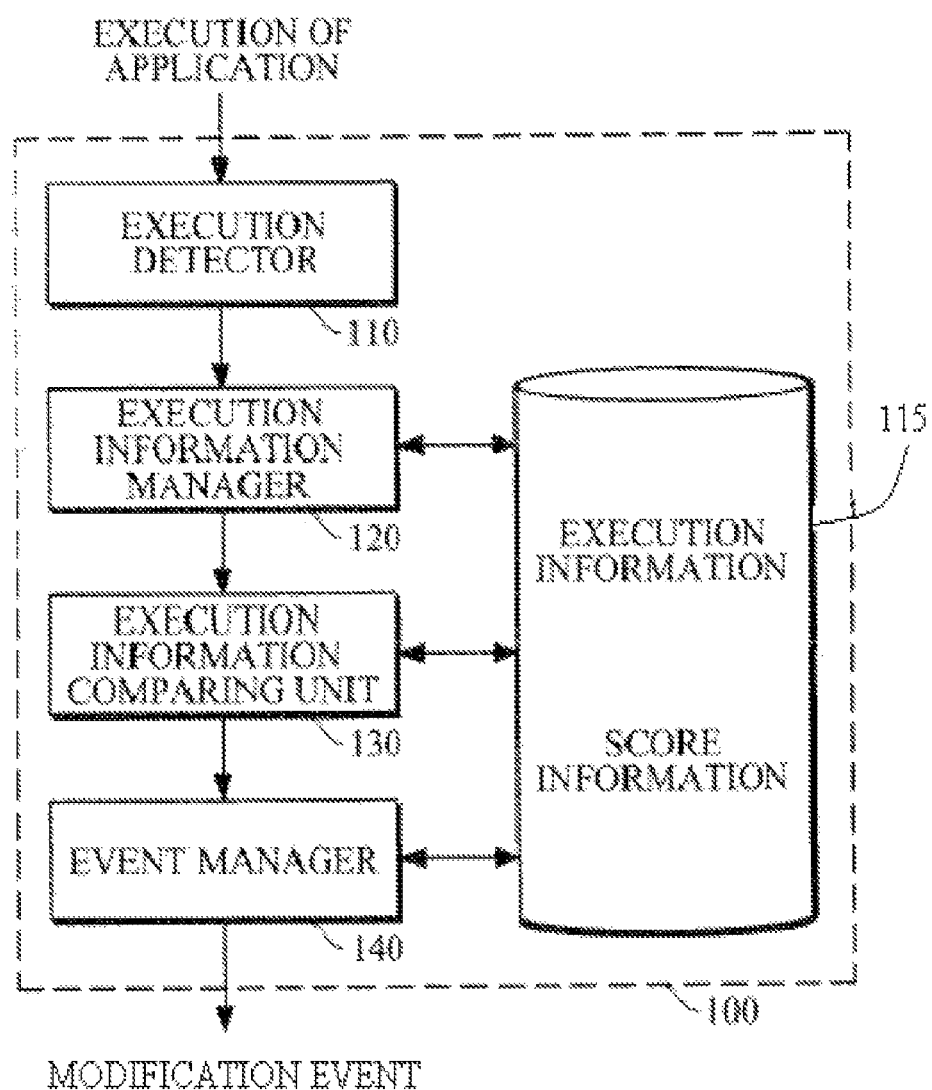
FIG. 1 is a block diagram illustrating an experience modification apparatus for a mobile terminal according to an exemplary embodiment.

Throughout the drawings and the detailed description, unless otherwise described, the same drawing reference numerals are understood to refer to the same elements, features, and structures. The relative size and depiction of these elements may be exaggerated for clarity, illustration, and convenience.

DETAILED DESCRIPTION OF THE ILLUSTRATED EMBODIMENTS

The invention is described more fully hereinafter with reference to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

FIG. 1 is a block diagram illustrating an experience modification apparatus 100 according to an exemplary embodiment. Referring to FIG. 1, the experience modification apparatus 100 includes an execution detector 110, a memory 115, an execution information manager 120, an execution information comparing unit 130, and an event manager 140.

The execution detector 110 detects the execution of an application provided by a mobile terminal or the execution of one of a plurality of applications provided by the mobile terminal. For example, the execution detector 110 may detect which one of a plurality of applications that are provided by the mobile terminal is executed based on information regarding an application called by the operating system (OS) of the mobile terminal.

If the execution of an application, such as call sending/receiving or message sending/receiving, is requested by the mobile terminal or by a user, the OS of the mobile terminal calls the corresponding application to execute it.

Each application, which can be called by the OS of the mobile terminal, has unique identification information, for example, an application name. Accordingly, the execution detector 110 can detect which one of the applications is executed with reference to associated unique identification information.

The execution information manager 120 updates execution information of the application stored in the memory 115 if the execution of a particular application is detected by the execution detector 110. For example, the execution information may be a number of times that the application has been executed or a length of time for which the application has been executed.

If the execution information is the number of times that the application has been executed the execution information manager 120 determines the number of times that the application has been executed from previously stored execution information of the application, increments the number of execution times by one, and then stores the incremented number as new execution information regarding the number of execution times. Thus, the execution information manager 120 updates the number of times that the application has been executed. Further, the number of execution times of each application may be stored and initialized in correspondence to the unique identification information of the application.

Meanwhile, if the execution information is the length of time for which the application has been executed, the execution information manager 120 measures the length of time for which the application is executed, and adds the measured length of time to previously stored execution information. Thus, the execution information manager 120 updates the length of time for which the application has been executed. Further, the information regarding the length of execution time of each application may be stored and initialized in correspondence to the unique identification information of the application.

The execution information comparing unit 130 compares the updated execution information with a threshold value. Here, the threshold value may be the same for all applications or different threshold values may be set for the respective applications.

For example, a threshold value of 50 may be set if a call sending application is executed, a threshold value of 100 may be set if a call receiving application is executed, a threshold value of 200 may be set if a message sending application is executed, and a threshold value of 300 may be set if a message receiving application is executed. Thereafter, the execution information comparing unit 130 compares the execution information of the application with a threshold value set in association with the application.

The execution information associated with each application may be stored in the memory 115. Further, the memory 115 may include score information indicating a score or level of the mobile terminal.

The event manager 140 generates a modification event according to the result of the comparison of the execution information of the application and the threshold value set in association with the application. The modification event, which involves all operations capable of modifying the applications of the mobile terminal, may be a level-up event, a hidden application providing event, a content providing event, an application expansion event, an avatar modifying event, a free coupon providing event, and the like.

For example, the event manager 140 may generate different modification events for individual applications that are executed.

Further, the event manager 140 may generate the modification event if the execution information of the application exceeds the threshold value associated with the application.

Alternatively or additionally, the event manager 140 may add a score to a previously stored mobile terminal score, thus updating the mobile terminal score, if the execution information of the application exceeds the threshold value associated with the application, and then generate the modification event according to the updated mobile terminal score.

In addition, the event manager 140 may assign greater scores for applications with lower use frequencies. For example, if a message sending application is executed and a threshold value designated for the message sending application is 200, and the number of messages sent through the message sending application exceeds 200, the execution information comparing unit 130 may determine that the execution information of the message sending application exceeds the threshold value. Then the event manager 140 may add a score, for example, 500 points, to a previously stored mobile terminal score, thus updating the mobile terminal score.

Further, if a scheduler application with a low use frequency is executed and a threshold value designated for the scheduler application is 50, the execution information comparing unit 130 may determine that the execution information of the scheduler application exceeds the threshold value if a user has used the scheduler application over 50 times, and then the event manager 140 may add a score, for example, 1000 points, to a previously stored mobile terminal score, thus updating the mobile terminal score.

If the modification event is a level-up event, the event manager 140 may raise a level of the mobile terminal if a current mobile terminal score exceeds a threshold value in order to provide differentiated or additional applications or services according to the level of the mobile terminal.

As another example, if the modification event is a hidden application providing event, the event manager 140 may execute a hidden application, such as a weather forecast application, which a developer has intentionally hidden at a development stage if a current mobile terminal score exceeds a threshold value.

As another example, if the modification event is a content providing event, the event manager 140 may provide content, such as additional ringtones, UI themes, emoticons, and the like, if a current mobile terminal score exceeds a threshold value. Here, the content, such as additional ringtones, UI themes, emoticons, and the like, also may be hidden content that the developer has intentionally hidden at the development stage.

As another example, if the modification event is an application expansion event, the event manager 140 may expand an application if a current mobile terminal score exceeds a threshold value. For example, by generating an application expansion event, the event manager 140 may execute a call log notification application to show missed calls.

As another example, if the modification event is an avatar modifying event, the event manager 140 may modify an avatar if a current mobile terminal score exceeds a threshold value. For example, the event manager 140 may change the appearance of an avatar displayed on a screen of the mobile terminal.

As another example, if the modification event is a free coupon providing event, the event manager 140 may provide a free coupon, such as a free content download coupon, if a current mobile terminal score exceeds a threshold value. The free coupon also may be hidden content that the developer has intentionally hidden in the development stage. For example, a user who has attained a free content download coupon may download desired content free of charge using the free coupon over a network and store it in his or her mobile terminal.

In summary, the experience modification apparatus 100 allows the execution information manager 120 to update execution information of the application, the execution information comparing unit 130 to compare the updated execution information with a threshold value, and the event manager 140 to generate a modification event according to the result of the comparison to modify the application of the mobile terminal.

According to an exemplary embodiment, the event manager 140 may initialize execution information if a modification event is generated.

According to an exemplary embodiment, the event manager 140 may initialize a mobile terminal score if a modification event is generated. The event manager 140 may initialize, instead of continuing to accumulate acquired scores, a previously stored mobile terminal score if a modification event is generated.

Figure 2:
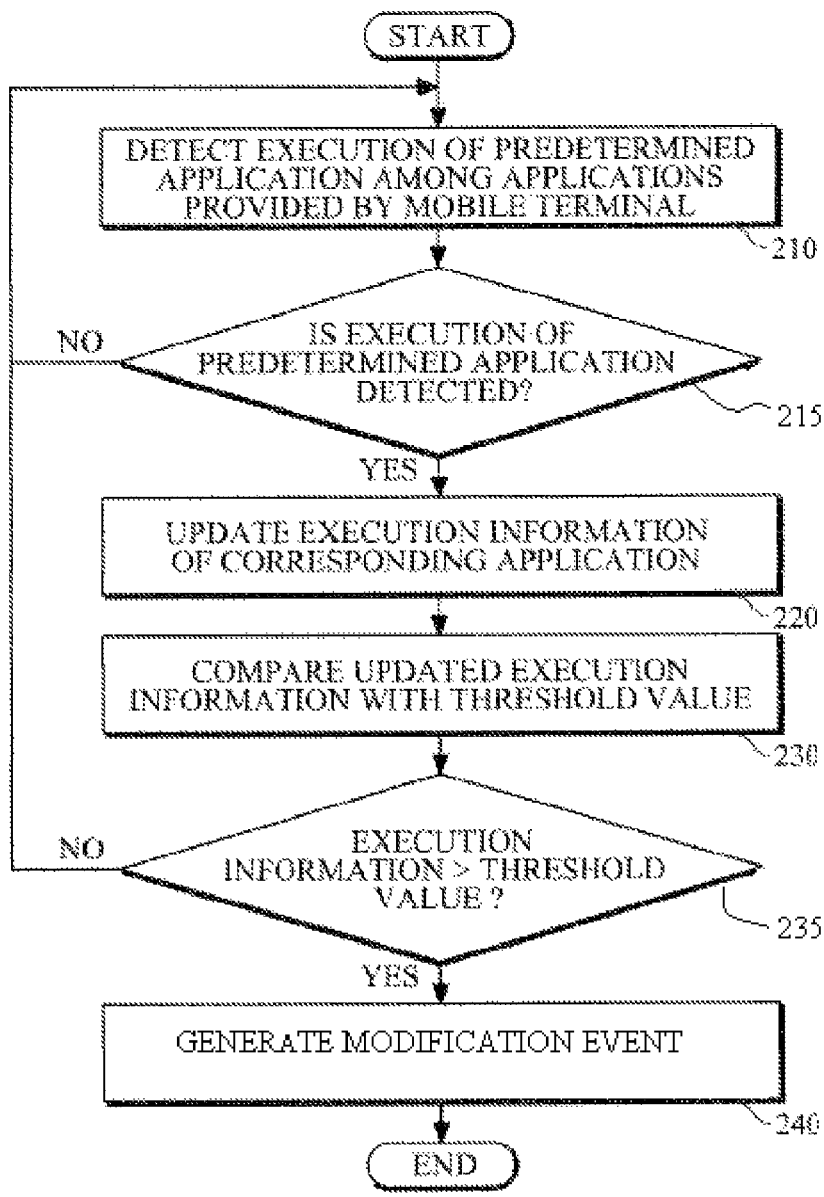
FIG. 2 is a flowchart illustrating an experience modification method, according to an exemplary embodiment, that is performed by the experience modification apparatus of FIG. 1.

Hereinafter, an experience modification method that is performed by the experience modification apparatus 100 of FIG. 1 will be described with reference to FIG. 2. FIG. 2 is a flowchart illustrating an exemplary experience modification method that is performed by the experience modification apparatus 100.

First, the experience modification apparatus 100 detects execution of an application or one application among a plurality of applications that are provided by the mobile terminal in operation 210. If the execution of an application is detected in operation 215, the experience modification apparatus 100 updates execution information of the application in operation 220.

Then, the experience modification apparatus 100 compares the updated execution information with a threshold value in operation 230. Successively, if the execution information indicates a value greater than the threshold value in operation 235, the experience modification apparatus 100 generates a modification event, such as a level-up event, a hidden application providing event, a content providing event, an avatar modifying event, a free coupon providing event, etc., in operation 240 according to the result of the comparison in operation 235.

Figure 3:
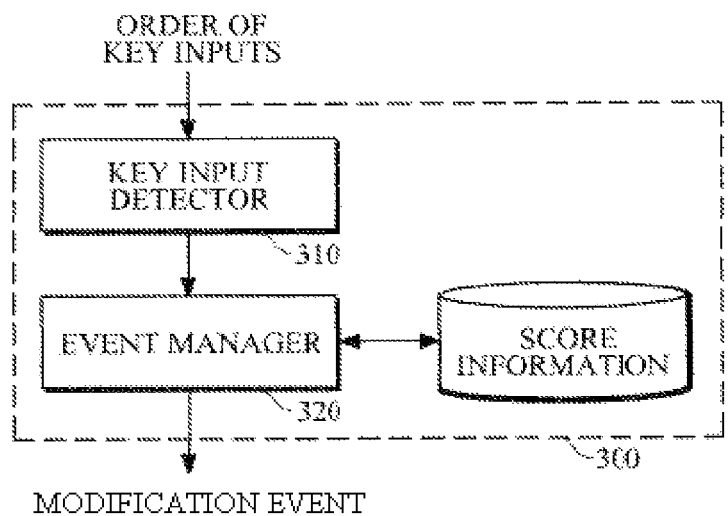
FIG. 3 is a block diagram illustrating an experience modification apparatus for a mobile terminal, according to an exemplary embodiment.

FIG. 3 is a block diagram illustrating an exemplary experience modification apparatus 300 for a mobile terminal. Referring to FIG. 3, the experience modification apparatus 300 includes a key input detector 310 and an event manager 320.

The key input detector 310 detects a specific order of key inputs. If a user presses particular keys on a mobile terminal, input characters are combined into a character string based on an automata theory. For example, the key input detector 310 may detect the specific order of key inputs with reference to a character string combined based on the automata theory.

If the specific order of key inputs is detected by the key input detector 310, the event manager 320 generates a modification event. The modification event, which involves all operations capable of modifying the applications of the mobile terminal, may be a level-up event, an hidden application providing event, a content providing event, an application expansion event, an avatar modifying event, a free coupon providing event, and the like.

For example, if a specific order of key inputs includes direction key manipulations in an order of right-left-down-down-up-up-right-left-up-right, the event manager 320 generates a modification event if a user has pressed the direction keys in the order of right-left-down-down-up-up-right-left-up-right.

Further, the event manager 320 may assign a score to update a mobile terminal score and then to generate a modification event according to the updated mobile terminal score if a specific order of key inputs is detected by the key input detector 310.

In this case, the event manager 320 may initialize a previously stored mobile terminal score in such a manner as to reset the previously stored mobile terminal score instead of continuing to accumulate acquired scores if such modification event is generated.

For example, if the modification event is a level-up event, the event manager 320 may raise a level of the mobile terminal in order to provide differentiated or additional applications or services according to the level of the mobile terminal if a current mobile terminal score exceeds a threshold value.

As another example, if the modification event is a hidden application providing event, the event manager 320 may execute a hidden application, such as a weather forecast application, which a developer has intentionally hidden in the development stage if a current mobile terminal score exceeds a threshold value.

As another example, if the modification event is a content providing event, the event manager 320 may provide content, such as additional ringtones, UI themes, emoticons and the like, if a current mobile terminal score exceeds a threshold value. Here, the content, such as additional ringtones, UI themes, emoticons and the like, also may be hidden content that the developer has intentionally hidden in the development stage.

As another example, if the modification event is an application expansion event, the event manager 320 may provide an expanded application if a current mobile terminal score exceeds a threshold value. For example, by generating an application expansion event, the event manager 320 may execute a call log notification application to show missed calls.

As another example, if the modification event is an avatar modifying event, the event manager 320 may modify an avatar if a current mobile terminal score exceeds a threshold value. For example, the event manager 320 may change the appearance of an avatar displayed on a screen of the mobile terminal.

As another example, if the modification event is a free coupon providing event, the event manager 320 may provide a free coupon, such as a free content download coupon, if a current mobile terminal score exceeds a threshold value. The free coupon also may be hidden content that the developer has intentionally hidden in the development stage. For example, a user who has attained a free content download coupon may download desired content free of charge using the free coupon over a network and store it in his or her mobile terminal.

In this way, the experience modification apparatus 300 generates a modification event through the event manager 320 to modify the corresponding application of the mobile terminal if a specific order of key inputs is detected by the key input detector 310.

Figure 4:
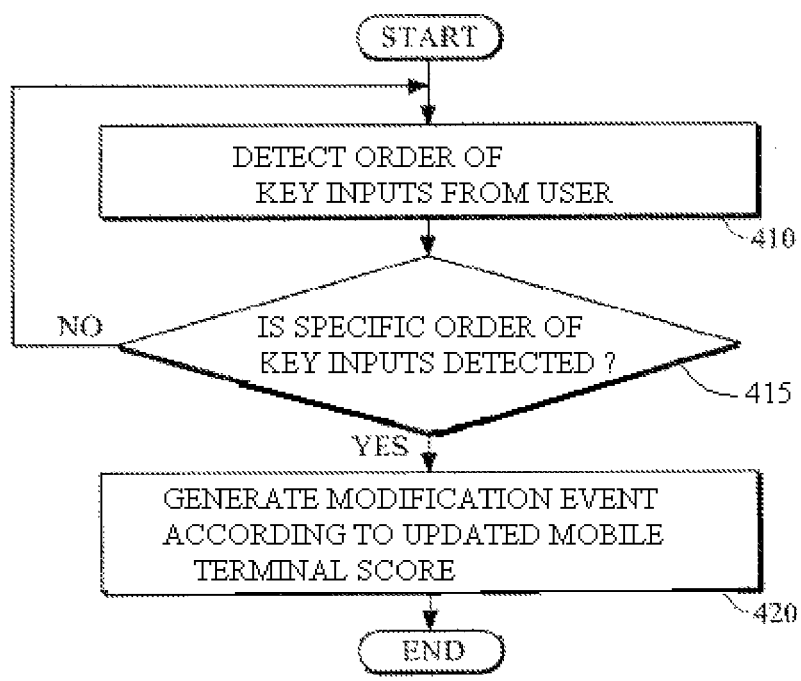
FIG. 4 is a flowchart illustrating an experience modification method, according to an exemplary embodiment, that is performed by the experience modification apparatus of FIG. 3.

Hereinafter, an experience modification method that is performed by the experience modification apparatus 300 will be described with reference to FIG. 4. FIG. 4 is a flowchart illustrating an exemplary experience modification method that is performed by the experience modification apparatus 300.

First, the experience modification apparatus 300 detects an order of key inputs from a user in operation 410. If a specific order of key inputs is detected in operation 415, the experience modification apparatus 300 generates a modification event, such as a level-up event, a hidden application providing event, a content providing event, a application expansion event, an avatar modifying event, a free coupon providing event, and the like in operation 420.

Whether to perform the experience modification method described above may be set by the user through manipulation on a menu setting screen of the mobile terminal. If the user inputs setting data for performing no experience modification methods, the mobile terminal supports only basic applications without performing the experience modification method.

If the user inputs setting data for performing the experience modification methods, the experience modification methods are performed that may provide modification capabilities to the mobile terminal.

The embodiments disclosed herein may be applied to technologies to control applications and modifications thereof.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An experience modification apparatus of a mobile terminal, the apparatus comprising:
    an execution detector to detect execution of an application;
    an execution information manager to update execution information of the application, if the execution of the application is detected by the execution detector;
    an execution information comparing unit to compare the updated execution information with a threshold value; and
    an event manager to generate a modification event according to the result of the comparison,
    wherein the threshold value of the application is based on a relative frequency of use of the application compared to a frequency of use of at least one other application, and
    wherein a threshold value for an application having a lower frequency of use is lower than a threshold value for an application having a higher frequency of use.

2. The experience modification apparatus of claim 1, wherein the event manager generates the modification event if the execution information of the application exceeds the threshold value.

3. The experience modification apparatus of claim 1, wherein, if the execution information of the application exceeds the threshold value, the event manager adds a score to a previously stored mobile terminal score to update a mobile terminal score and generates the modification event according to the updated mobile terminal score.

4. The experience modification apparatus of claim 1, wherein the execution information is a number of times that the application has been executed.

5. The experience modification apparatus of claim 1, wherein the event manager initializes the execution information if the modification event is generated.

6. The experience modification apparatus of claim 1, wherein the event manager initializes a mobile terminal score if the modification event is generated.

7. The experience modification apparatus of claim 1, wherein a threshold value is provided for each application of the mobile terminal.

8. The experience modification apparatus of claim 1, wherein the modification event is a level-up event.

9. The experience modification apparatus of claim 8, wherein the event manager provides applications or services according to a level of the mobile terminal.

10. The experience modification apparatus of claim 1, wherein the modification event is a hidden application providing event.

11. The experience modification apparatus of claim 1, wherein the modification event is a content providing event in which a ringtone, a UI theme, or an emoticon is provided.

12. The experience modification apparatus of claim 1, wherein the modification event is an avatar modifying event.

13. The experience modification apparatus of claim 1, wherein the event manager generates a different modification event according to the application of the mobile terminal.

14. The experience modification apparatus of claim 1, wherein the execution information is a length of time for which the application has been executed and the execution information is updated according to the length of time.

15. An experience modification method, comprising:
    detecting execution of an application of a mobile terminal;
    updating execution information of the application;
    determining if the updated execution information is greater than a threshold value; and
    generating a modification event if the updated execution information is determined to be greater than the threshold value,
    wherein the threshold value of the application is based on a relative frequency of use of the application compared to a frequency of use of at least one other application, and
    wherein a threshold value for an application having a lower frequency of use is lower than a threshold value for an application having a higher frequency of use.

16. An experience modification apparatus of a mobile terminal, the apparatus comprising:
    an execution detector to detect execution of at least one of a first application and a second application;
    an execution information manager to update first execution information of the first application, if the execution of the first application is detected by the execution detector and to update second execution information of the second application, if the execution of the second application is detected by the execution detector;
    an execution information comparing unit to compare the updated first execution information with a first threshold value and to compare the updated second execution information with a second threshold value; and
    an event manager to add a score to a previously stored mobile terminal score to update a mobile terminal score and to generate a modification event according to the updated mobile terminal score, if the first execution information of the first application exceeds the first threshold value or the second execution information of the second application exceeds the second threshold value, wherein the first application is executed more frequently than the second application, and the event manager adds a higher score to the previously stored mobile terminal score if the second execution information of the second application exceeds the second threshold value than if the first execution information of the first application exceeds the first threshold value.

17. An experience modification apparatus of a mobile terminal, the apparatus comprising:

an execution detector to detect execution of an application;

an execution information manager to update execution information of the application, if the execution of the application is detected by the execution detector;

an execution information comparing unit to compare the updated execution information with a threshold value; and an event manager to generate a modification event according to the result of the comparison, wherein the execution information of the application is updated according to a relative frequency of use of the application compared to a frequency of use for at least one other application, and wherein execution information of an application having a lower frequency of use is update with a greater value than execution of an application having a higher frequency of use.

* * * * *